J. T. BERTRAND.
KNOCKDOWN ISOTHERMAL SHIPPING BOX.
APPLICATION FILED SEPT. 14, 1917.
1,267,840.
Patented May 28, 1918.
4 SHEETS—SHEET 1.
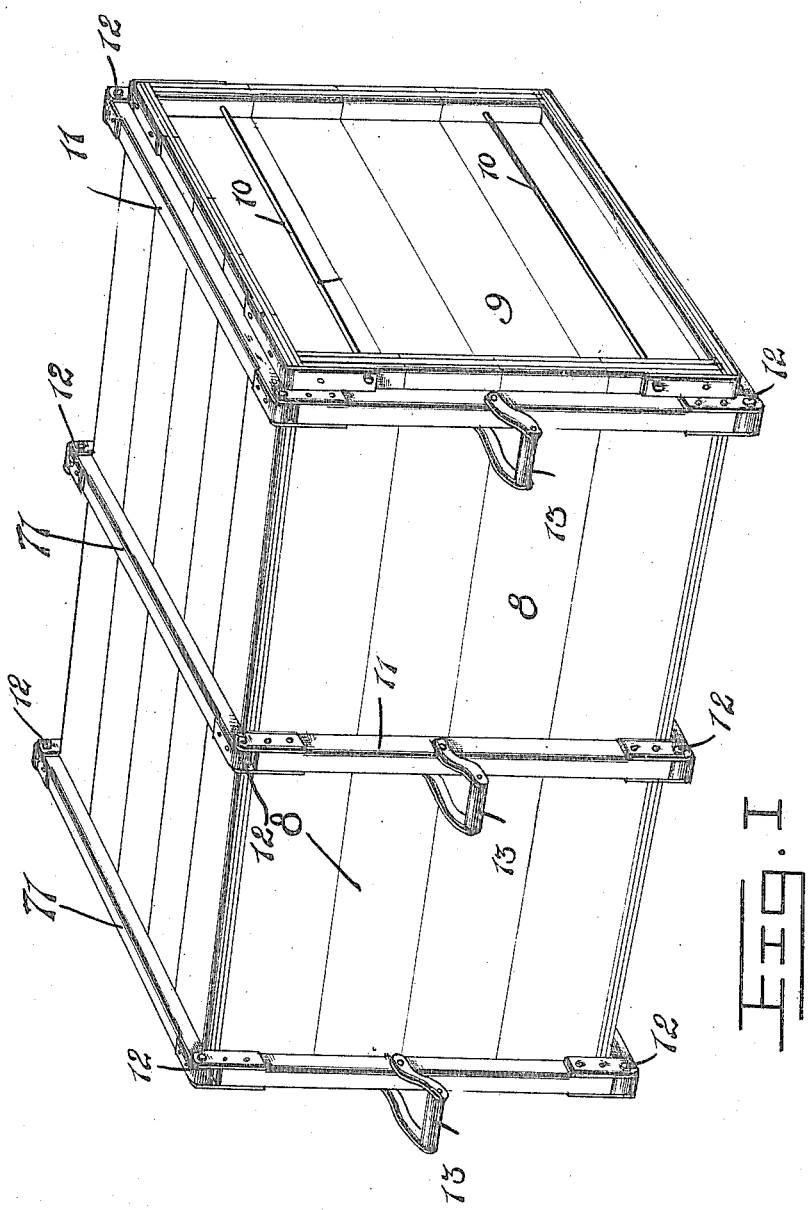
Inventor
Joseph Tétu Bertrand
By Marion Marion
Attorneys

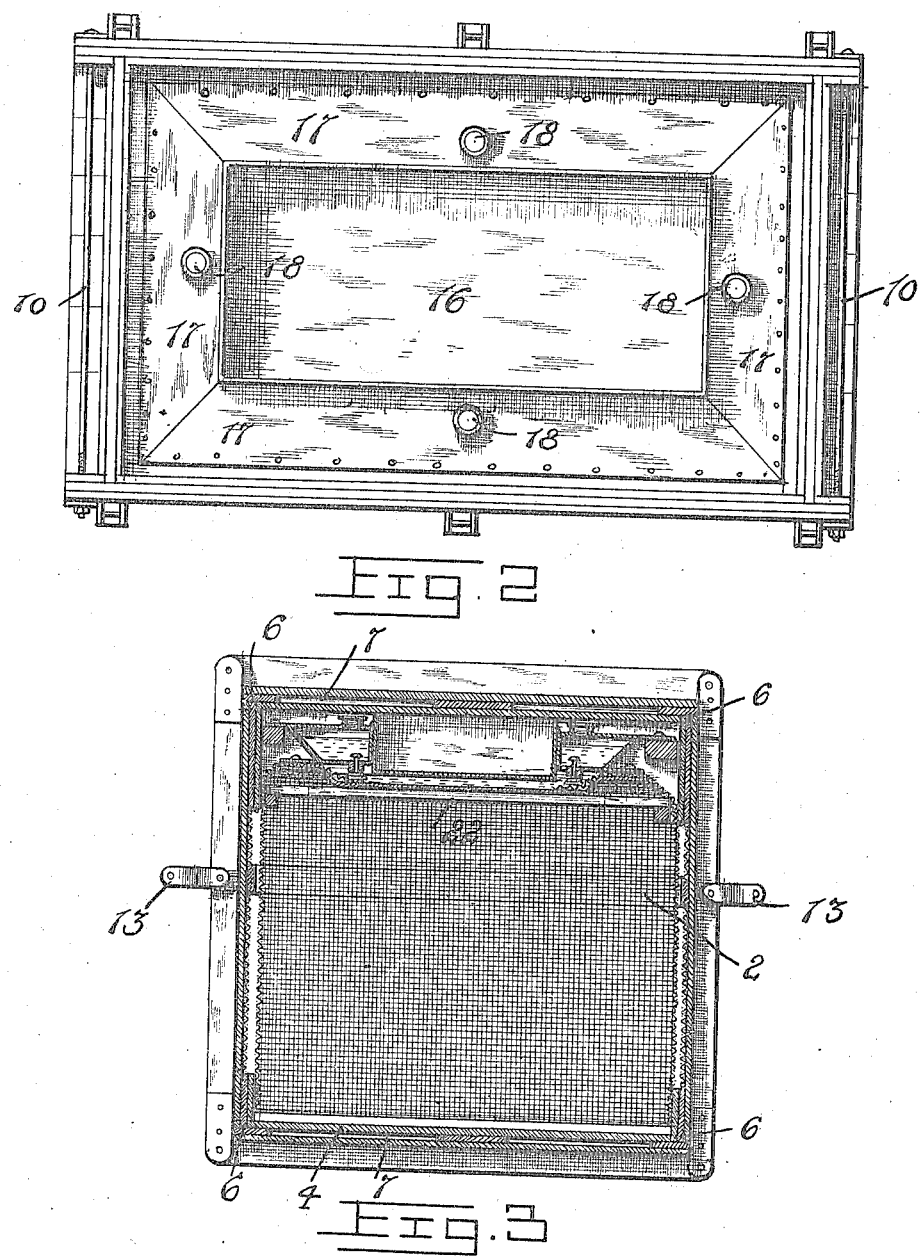

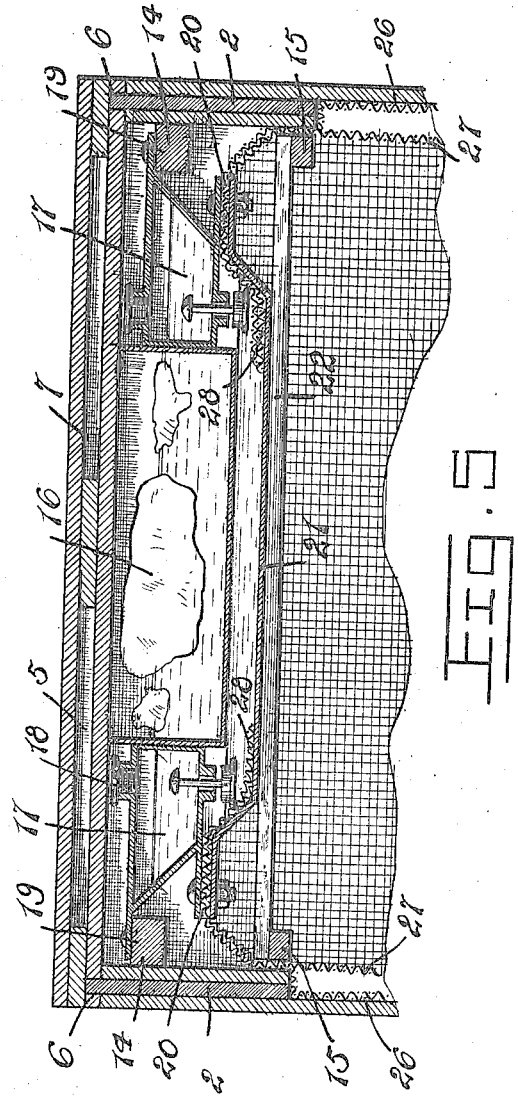
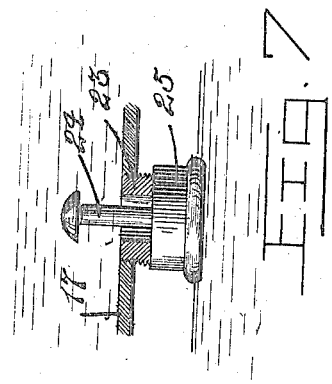
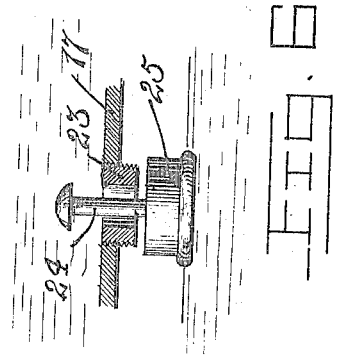

UNITED STATES PATENT OFFICE.

JOSEPH TÉTU BERTRAND, OF ISLE VERTE, QUEBEC, CANADA.

KNOCKDOWN ISOTHERMAL SHIPPING-BOX.

1,267,840.  Specification of Letters Patent.  Patented May 28, 1918.

Application filed September 14, 1917. Serial No. 191,334.

*To all whom it may concern:*

Be it known that I, JOSEPH TÉTU BERTRAND, a subject of the King of Great Britain, residing at Isle Verte, Province of Quebec, Canada, have invented certain new and useful Improvements in Knockdown Isothermal Shipping-Boxes; and I do hereby declare that the following is a full, clear, and exact description of the invention, such as will enable others skilled in the art to which it appertains to make and use the same.

In Canadian Patent Number 170,291, granted to me on June 20, 1916, several forms of isothermal boxes were disclosed, which were to be used more particularly by fishermen wherein the bait or the fish could be kept by refrigerating the box by means of a pump and tubes through which cold sea water was made to circulate.

The present invention relates to such isothermal boxes which are used by the producer for supplying perishable articles to the consumer and these boxes may not only be used for the transportation of fish but may also be used for the transportation of milk or other perishable goods or articles of foods.

An object of the present invention is to provide a strong, durable and comparatively inexpensive box of this character with a cooling or chilling plant arranged therein whereby articles carried within the box may be kept for a desirable length of time, at or about a given temperature, so that the perishable goods contained within the box will have the same freshness as they had at the point of shipping. The cooling medium for the boxes forming the subject matter of the present invention may be water, but ice or snow may be used and which may be stored within a reservoir within the box. When ice or snow is not available another refrigerating means may be used wherein the heat from the interior of the box may be absorbed around the exterior of the box by the evaporation of the water which is fed automatically and continuously for a certain period of time.

A further object of the present invention is to provide boxes of this character of a knock-down construction, whereby when the same are being returned to the shipper or producer the empty boxes will occupy but a limited amount of space, thereby greatly decreasing the shipping charges on such boxes.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure is a perspective view of the box embodying the present invention when completely closed;

Fig. 2 is a plan view of the same with the top removed;

Fig. 3 is a transverse vertical section;

Fig. 5 is a detail view similar to Fig. 3 showing the upper portion of the box on an enlarged scale;

Fig. 6 is a detail view of one of the valves when in open position; and,

Fig. 7 is a similar view showing the valve when in closed position.

Referring now more particularly to the accompanying drawings wherein like and corresponding parts are designated by similar reference characters throughout the several views.

Figure 4:
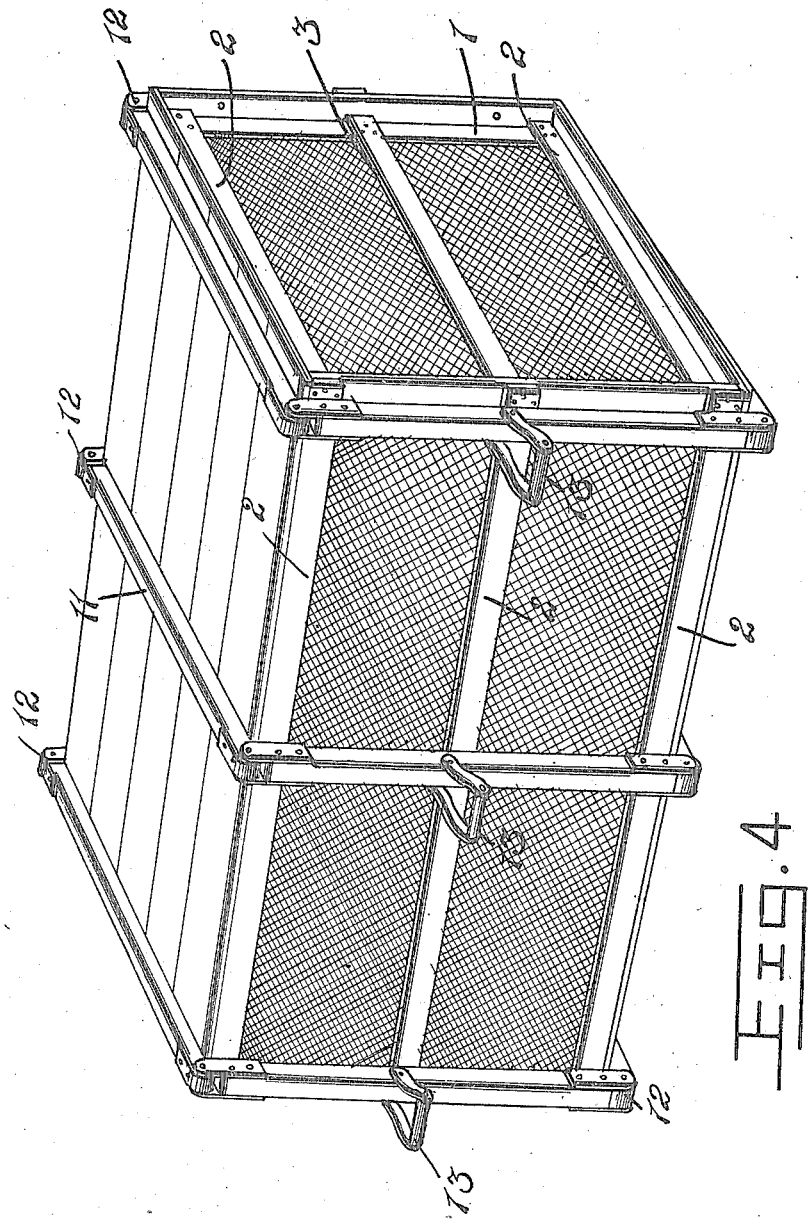
Fig. 4 is a perspective view of the box when the closed side walls of the box have been removed.

The box herein shown comprises side and end partitions each of which comprises vertical bars 1 and the horizontal upper and lower bars 2 and the intermediate strengthening bars 3. Adapted to be connected to the side and end partitions is a bottom 4 and a top 5. The upper and lower bars 2 of the side and end partitions are to rest within the recesses 6 formed within the top and bottom of the box to provide a more rigid construction. The top and bottom as herein shown comprise two plates or sections which are in spaced relation to form the air spaces 7 therebetween. When it is desired to completely close the box for a purpose which will be later described the side and end walls 8 and 9 may be placed upon the side and end partitions respectively and the opposite ends of the side walls 8 may be connected by means of the rods 10 as shown in Fig. 1 for retaining the side and end walls in place. Clamping bars may be placed around the box for holding the same in upright position and these clamping members comprise each four bars 11 which are hingedly connected as at 12 and the side or vertical bars 11 are provided with the handles 13, whereby the box may be easily carried from place to place.

From the foregoing construction it is obvious that the box provided is of a knockdown construction and the various sections thereof may be disassembled and placed in a compact form, so that they will take up but a comparatively small amount of space during shipment or when it is desired to store the same.

The cooling and refrigerating medium comprises a supply tank which is arranged within the box for supplying the refrigerant throughout the box, so that the articles contained therein may be properly cooled for the desirable length of time.

Secured to the longitudinal members 2 are the bars 14 and 15. Supported upon these bars is a tank comprising a central reservoir 16 in which may be stored ice or snow and surrounding this central reservoir are a plurality of tanks 17 each having a closure controlled inlet opening 18 whereby water may be supplied to the tanks 17. A flange 19 is formed with the tanks and is secured upon the bars 14 whereby the tank may be suspended within the upper end of the box, but, of course, it is to be understood that it may be placed in any desired position within the box. Secured with the flanges 20 is a pan 21 which catches the water as the same is being supplied from the tanks 17. Connecting with the bars 15 are the transverse bars 22 and resting upon these transverse bars 22 is the pan 21. Secured within the bottom of each of the tanks 17 is a nipple 23 which establishes a communication between the tanks 17 and the pan 21 and slidably mounted within the nipples 23 are the stems 24 carrying the float valves 25. When the water becomes low in the pan 21 the float valves 25 will descend, thereby permitting the water from the tanks 17 to pass into the pan 21, but as the water rises within the pan 21 as better shown in Fig. 7 of the drawings, the float valves 25 will rise thereby cutting off the communication between the tanks 17 and the pan 21. In this manner it is apparent that the water from the tanks 17 may be automatically fed into the pan 21 until the total supply of water contained within the tanks is exhausted. Secured between the pan 21 and the flanges 20 are the canvas layers 26 and 27 which canvas layers extend down over the sides and ends of the box and the upper ends of these canvas layers project within the pan 21 as at 28, so that the water contained within the pan 21 will be automatically fed down along the sides of the box due to the absorption of the water by means of the canvas layers. These canvas layers when extending down along the sides and ends of the box are held in spaced relation to form an air space therebetween and the outer layers 26 are preferably made of coarse canvas, so that the water may travel more freely therethrough. The inner layers 27 are shown communicating within the pan 21 but this is not necessary as the inner layers need not be supplied with water and they may be made of other suitable material such as glass or metal which are good conductors of heat or cold.

From the foregoing it is obvious that where conditions will permit ice or snow to be supplied to the reservoir 16 that this cooling medium will be sufficient to keep the articles contained within the box cool for the desired length of time, but when it is impossible to obtain ice or snow, water may be placed within the tanks 17 and this water will be automatically fed down along the sides and ends of the box whereby through the evaporation of the water saturated through the canvas layers, the interior of the box will be cooled. When this refrigerating system is put in use, of course the sides and ends 8 and 9 of the box must be removed, but when ice is stored within the receptacle 16 the side and end members 8 and 9 must be placed in position as better shown in Fig. 1.

The interior of the box may be supplied with suitable shelves or partitions for retaining the articles in proper position within the box.

Having thus fully described my invention, what I claim as new and desire to secure by Letters Patent is:

1. A shipping box of the character described comprising a plurality of knockdown sections, a support arranged within said sections, a reservoir arranged upon said support, a plurality of tanks surrounding said reservoir, a pan arranged below said reservoir and tanks, valve controlled communications between said tanks and said pan and a lining for the interior of said box comprising absorbent material and the upper ends of said lining adapted to communicate with said pan.

2. A shipping box of a knock-down construction comprising end and side sections, each section comprising vertical and horizontal bars, two partitions of absorbent material carried by the bars of each section, a top and bottom comprising two spaced partitions, detachable end and side members for covering said sections, means for retaining said box in an upright position and a liquid cooling agent adapted to be retained within said box and adapted to pass over said absorbent partitions substantially as and for the purpose specified.

3. A shipping box comprising a plurality of sections, a canvas lining for the inner faces of said sections, a support arranged within said box, a central reservoir, a plurality of tanks connected to and surrounding said reservoir, a pan mounted upon said support, flanges formed with said tanks and said pan, the upper end of said lining adapted to be retained between said flanges and extending within said pan, means of communication between said tanks and said pan and float valves arranged within said means of communication substantially as and for the purpose specified.

In witness whereof I have hereunto set my hand.

JOSEPH TÉTU BERTRAND.

Copies of this patent may be obtained for five cents each, by addressing the "Commissioner of Patents, Washington, D. C."